May 26, 1959     C. W. MacMILLAN     2,887,902
BOB WEIGHT FOR BALANCE TESTING OF COUNTERBALANCED CRANKSHAFT
Filed Jan. 10, 1958
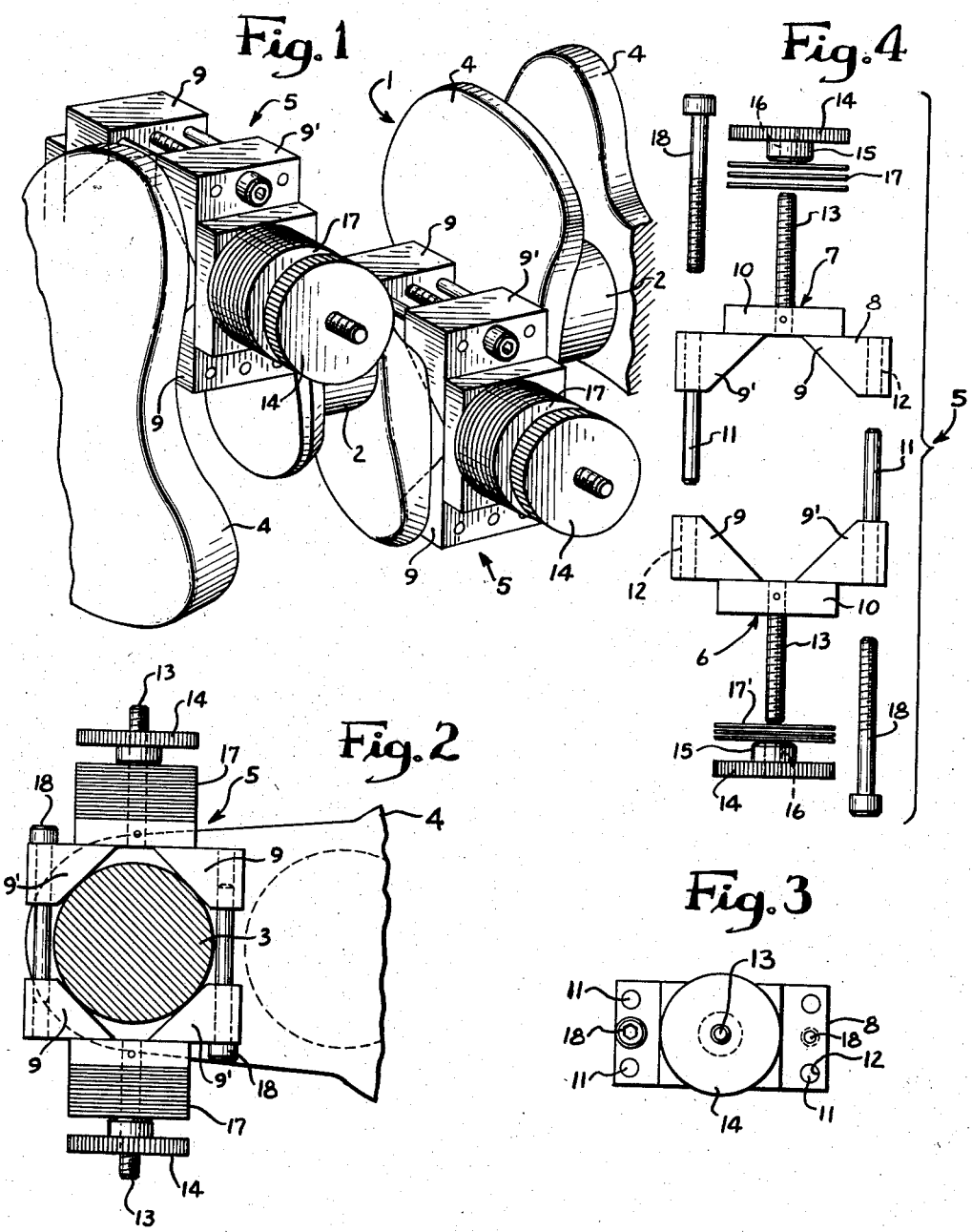
INVENTOR
CHARLES W. MacMILLAN
by: Garry, Desmond & Parker
ATTYS.

United States Patent Office 2,887,902
Patented May 26, 1959

2,887,902

BOB WEIGHT FOR BALANCE TESTING OF COUNTERBALANCED CRANKSHAFT

Charles W. MacMillan, Rock Island, Ill., assignor to Bear Manufacturing Company, Rock Island, Ill., a corporation of Delaware Application January 10, 1958, Serial No. 708,121

5 Claims. (Cl. 74—603)

This invention relates to improvements in balancing weights which may be mounted upon the crankshaft of a V–8 engine when testing the balance thereof on a balance testing machine.

The usual crankshaft of a V–8 engine is constructed with permanent counterweights to counteract the centrifugal forces set up by the piston and rod assembly. Consequently, when rotating the crankshaft without the piston and rod assembly connected thereto, as when the crankshaft alone is rotated in a conventional balance testing machine, the permanent counterweights induce a centrifugal force on the crankshaft which is not representative of the actual working conditions of the crankshaft.

Accordingly, when testing the balance of such a crankshaft, it is necessary to compensate for the loss of the piston and rod assembly, by supplying dummy weights or so-called bob weights to the crankshaft which are representative and equivalent to the absent piston and rod assembly in so far as their contributions to the forces of the system are concerned.

One of the important features of the present invention resides in the provision of a bob weight which is of simple construction; can be applied to crankshafts having crankpins of different diameters and can have its weight component conveniently changed.

Another important feature of the invention resides in the provision of a bob weight which is constructed in identical halves whereby the halves may be economically constructed in large quantity.

Other features and advantages of the present invention will be apparent from the accompanying drawing and following detailed description.

In the drawing,

Fig. 1 is a fragmentary perspective view of a V–8 crankshaft carrying bob weights comprising the embodiment of the present invention.

Fig. 2 is a sectional view through a crankshaft crankpin illustrating the application of the bob weight to the crankpin.

Fig. 3 is a top plan view of the improved bob weight.

Fig. 4 is an exploded view of the bob weight illustrating the component parts thereof.

Referring in detail to the drawing, 1 indicates a fragmentary portion of a crankshaft for an eight cylinder V-type internal combustion engine. The crankshaft 1 comprises portions 2 which seat in the main bearings of the engine (not shown) and constitute the axis about which the crankshaft revolves. Crankpins 3, one only of which is illustrated, are radially offset from the axis of the portions 2 and constitute the pins upon which the connecting rod bearings (not shown) are secured.

To counterbalance the rotating weights of the piston rod assemblies during operation, counterweights 4 comprise a portion of the crankshaft 1, said counterweights having their centers of gravity substantially diametrically offset from the crankpins 3. Thus, during operation of the engine, the crankshaft is intended to be balanced.

Conventional balance testing machines cannot determine the condition of balance of a crankshaft with the piston rod assembly secured thereto. Therefore, dummy weights equivalent, in so far as the rotational forces are concerned, to the piston rod assembly to be used are applied to the crankshaft. Such dummy weights are secured to the crankpins 3.

The weight of a predetermined dummy weight to be applied to a predetermined crankpin is dependent upon the weight characteristics of the piston rod assembly to be applied to said crankpin. In determining the weight of the dummy weight, the entire connecting rod, the rotating end of the connecting rod including its bearing, and the piston, rings and piston pin are separately accurately weighed. Empirically, 100 percent of the weight of the rotating portion of the end of the connecting rod and piston assembly is added to 50 percent of the weight of the reciprocating portion thereof to arrive at the dummy weight required.

In order, therefore, properly to condition the crankshaft 1 for a balancing test a dummy weight or bob weight 5 is mounted upon each crankpin 3. The bob weight 5 comprises two identical half-portions 6 and 7. Each half portion comprises a yoke 8 which includes a pair of tapered blocks 9 and 9' and a joining block 10 rigidly securing the tapered blocks together. The tapered block 9' of each half-portion 6 and 7, carries a pair of spaced dowel pins 11 and each tapered block 9 is provided with spaced openings 12 into which the respective dowel pins 11 slidably fit.

A screw shank 13 is carried by each joining block 10 and extends transversely to said blocks. A knurled wheel 14 and a boss 15 carried thereby are provided with an internally threaded bore 16 whereby said knurled wheel engages with each screw 13. A plurality of centrally apertured discs 17 are employed as variable weights and are adapted to be carried upon each screw 13, said weights being confined between the bosses 15 and the respective joining blocks 10.

To secure the bob weight 5 upon the crankpin 3, the respective half-portions 6 and 7 are positioned on opposite sides of the crankpin with the tapered surfaces of the blocks 9 and 9' in tangential line contact with the surface of the crankpin. Block 9' of each half is provided with a bore (not shown) through which the threaded shank of a cap screw 18 freely extends. Each tapered block 9 is provided with a threaded bore (not shown) which is in axial alignment with the bore in the companion tapered block 9, when the blocks are justaposed, whereby the cap screw may threadedly engage with the aperture in block 9 to secure the bob weight upon the crankpin 3.

As hereinbefore described, the companion half-portions 6 and 7 of the bob weight 5 are identical and they are, including dowels 11, wheels 14, screws 18 and 13 and blocks 9, 9' and 10, equal in weight, and when the bob weight 5 is secured to the crankpin 3, there will be equal numbers of discs on each half-portion.

Of course, for a predetermined piston rod assembly, a predetermined number of pairs of discs will be used. For piston rod assemblies of different weights, pairs of discs will be added or removed in order that the bob weight as a whole will conform with the weight characteristics of the piston rod assembly.

By the provision of the tapered surfaces upon the blocks 9 and 9', the bob weight has application to crankpins of a large range of different diameters and, hence, only a limited number of bob weights need be stocked. In addition, by the provision of the easily applied and removed disc weights 17 the bob weight embodying the present invention may be quickly and conveniently adapted to supplant or be a weight substitute for many piston rod assemblies having different weight characteristics.

Many non-inventive variations of the present invention may be devised by any one skilled in the art and, hence, it is not intended that the present invention be limited to the exact details shown and described, except as necessitated by the appended claims.

I claim as my invention:

1. A bob weight for counterbalanced crankshafts of V-type eight cylinder internal combustion engines, which comprises, a pair of substantially identical half-portions for embracing opposite sides of a crankshaft crankpin, each half-portion comprising a yoke having opposed oppositely inclined contact surfaces for contacting the crankpin at circumferentially spaced portions thereof, securing means carried by each opposite yoke for engaging the other yoke to secure said yokes together and in diametrically opposite positions on said crankpin, aligning means carried by each yoke slidably engageable with the opposed yoke for preventing relative lateral movement of said yokes, means carried by each yoke for holding incremental weights upon the respective yokes, and securing means carried by said holding means for immovably securing said incremental weights to the respective yokes.

2. A bob weight for counterbalanced crankshafts of V-type eight cylinder internal combustion engines, which comprises, a pair of substantially identical half-portions for embracing opposite sides of a crankshaft crankpin, each half-portion comprising a yoke having spaced opposed oppositely inclined contact surfaces for contacting the crankpin at circumferentially spaced portions thereof, securing means carried by each opposite yoke for engaging the other yoke to secure said yokes together and in diametrically opposite positions on said crankpin, dowel pins carried by each yoke slidably engageable in receiving apertures in the opposed yoke for preventing relative lateral movement of said yokes, means carried by each yoke for holding incremental weights upon the respective yokes, and securing means carried by said holding means for immovably securing said incremental weights to the respective yokes.

3. A bob weight for counterbalanced crankshafts of V-type eight cylinder internal combustion engines, which comprises, a pair of substantially identical half-portions for embracing opposite sides of a crankshaft crankpin, each half-portion comprising a yoke having opposed oppositely inclined contact surfaces for contacting the crankpin at circumferential spaced portions thereof, securing means carried by each opposite yoke for engaging the other yoke to secure said yokes in diametrically opposite positions on said crankpin, aligning means carried by each yoke slidably engageable with the opposed yoke for preventing relative lateral movement of said yokes, screw means carried by each yoke for holding incremental weights upon the respective yokes, and nut means carried by said screw means for immovably securing said incremental weights to the respective yokes, the axis of said screw means on each yoke being in bisecting relationship to the angle formed by the inclined contact surfaces of said yoke.

4. A bob weight for counterbalanced crankshafts of V-type eight cylinder internal combustion engines, which comprises, a pair of substantially identical half-portions for embracing opposite sides of a crankshaft crankpin, each half-portion comprising a yoke having opposed oppositely inclined contact surfaces for making line contact with the crankpin at circumferential spaced portions thereof, a cap screw carried by each opposite yoke for threadedly engaging the other yoke to secure said yokes in diametrically opposite positions on said crankpin, dowel pins carried by each yoke slidably engageable in apertures provided in the opposed yoke for preventing relative lateral movement of said yokes, means carried by each yoke for holding incremental weights upon the respective yokes, and removable securing means carried by said holding means for rigidly securing said incremental weights to the respective yokes.

5. A bob weight for counterbalanced crankshafts of an internal combustion engine, which comprises, a pair of substantially identical half-portions for embracing opposite sides of a crankshaft crankpin, each half-portion comprising a yoke having opposed divergently inclined planar contact surfaces for making line contact with the crankpin at circumferential spaced portions thereof, securing means carried by each opposite yoke for engaging the other yoke to secure said yokes in diametrically opposite embracing positions on said crankpin, aligning means carried by each yoke slidably engageable with the opposed yoke for preventing relative lateral movement of said yokes, a screw shank carried by each yoke, centrally apertured disc weights removably threaded on each screw shank, and knurled wheel nut means threaded upon each screw shank for securing said disc weights upon the respective yokes.

References Cited in the file of this patent

UNITED STATES PATENTS

| | | |
|---|---|---|
| 454,227 | Reitz | June 16, 1891 |
| 502,310 | Miller | Aug. 1, 1893 |
| 869,901 | Hahn | Nov. 5, 1907 |
| 1,259,086 | Dunn | Mar. 12, 1918 |
| 1,928,245 | Bloss et al. | Sept. 26, 1933 |
| 2,140,398 | Buckingham | Dec. 13, 1938 |